US006995936B2

(12) United States Patent
Denda et al.

(10) Patent No.: US 6,995,936 B2
(45) Date of Patent: Feb. 7, 2006

(54) INFORMATION RECORDING APPARATUS AND INFORMATION RECORDING METHOD

(75) Inventors: Akihiro Denda, Saitama-ken (JP); Yoshiya Nonaka, Saitama-ken (JP)

(73) Assignee: Pioneer Corporation, Tokyo-to (JP)

( * ) Notice: Subject to any disclaimer, the term of this patent is extended or adjusted under 35 U.S.C. 154(b) by 450 days.

(21) Appl. No.: 09/829,082

(22) Filed: Apr. 10, 2001

(65) Prior Publication Data

US 2001/0030823 A1 Oct. 18, 2001

(30) Foreign Application Priority Data

Apr. 14, 2000 (JP) ............................ 2000-113917

(51) Int. Cl.
*G11B 5/09* (2006.01)

(52) U.S. Cl. ........................... 360/53; 360/54; 360/15; 360/22; 360/78.04; 369/275.3; 369/30.09; 369/53.1

(58) Field of Classification Search .................. 360/53, 360/48; 714/5–7; 707/200; 369/13.16, 369/13.26, 13.27
See application file for complete search history.

(56) References Cited

U.S. PATENT DOCUMENTS 6,615,363 B1 * 9/2003 Fukasawa ...................... 714/5
6,839,311 B1 * 1/2005 Yamanoi et al. ......... 369/53.21
2002/0099722 A1 * 7/2002 Kimura et al. .............. 707/200

FOREIGN PATENT DOCUMENTS

JP 10-144011 * 5/1998
JP 10144011 A * 5/1998

* cited by examiner

*Primary Examiner*—David Hudspeth
*Assistant Examiner*—Natalia Figueroa
(74) *Attorney, Agent, or Firm*—Young & Thompson

(57) ABSTRACT

An information recording apparatus for recording content information on an information recording medium includes a main information recording area on which main information to be reproduced is recorded, and a plurality of content information recording areas on which content information to be reproduced to indicate contents of the main information is recorded. The apparatus includes a recording device, a confirming device and a control device. The recording device records the content information on a part of the plurality of content information recording areas. The confirming device confirms a recording result of the content information thus recorded. The control device controls the recording device, only when the recording result is confirmed to be successful, so that content information that is identical with the content information recorded on the part of the content information recording areas can be recorded on the other part of the content information recording areas.

14 Claims, 7 Drawing Sheets

FIG. 6

| | FIRST CLUSTER | SECOND CLUSTER | THIRD CLUSTER |
|---|---|---|---|
| BEFORE WRITE-IN | A | A | A |
| AFTER "STEP S5 : YES" | B | A | A |
| AFTER "STEP S7 : YES" | B | B | A |
| AFTER "STEP S9 : YES" | B | B | B |

FIG. 7 (a)

| | FIRST CLUSTER | SECOND CLUSTER | THIRD CLUSTER |
|---|---|---|---|
| BEFORE WRITE-IN | A | A | A |
| AFTER "STEP S5 : NO" | ERROR | A | A |

FIG. 7 (b)

| | FIRST CLUSTER | SECOND CLUSTER | THIRD CLUSTER |
|---|---|---|---|
| BEFORE WRITE-IN | A | A | A |
| AFTER "STEP S5 : YES" | B | A | A |
| AFTER "STEP S7 : NO" | B | ERROR | A |

FIG. 7 (c)

| | FIRST CLUSTER | SECOND CLUSTER | THIRD CLUSTER |
|---|---|---|---|
| BEFORE WRITE-IN | A | A | A |
| AFTER "STEP S5 : YES" | B | A | A |
| AFTER "STEP S7 : YES" | B | B | A |
| AFTER "STEP S9 : NO" | B | B | ERROR |

INFORMATION RECORDING APPARATUS AND INFORMATION RECORDING METHOD

BACKGROUND OF THE INVENTION

1. Field of the Invention

The present invention belongs to a technical field of an information recording apparatus and an information recording method, and more particularly to a technical field of an information recording apparatus and an information recording method for recording content information that indicates contents of main information such as music information to be reproduced and is used for reproducing the main information on an information recording medium together with the main information.

2. Description of the Related Art

In these years, recording compressed information such as music information on an MD, which is a small-size recordable optical disc, as well as reproducing the information, have commonly been implemented.

Here, on the MD, an area neighboring an inner circle of a program area on which the information such as music information is actually recorded is used as a so-called UTOC (User Table of Contents) area. On the UTOC area, table-of-contents information (UTOC information), which includes the number of songs recorded on the program area, a starting address and an ending address indicating a record range of the music information, etc. on the MD, names of the songs, and times required for reproducing the songs, is recorded as the table-of-contents information corresponding to the music information.

Then, upon reproduction of the recorded music information, etc., example, the table-of-contents information cannot correctly be detected. As a result, not only the new table-of-contents information, but also the previous table-of-contents information indicating the music information, etc. immediately before implementation of the above-described recording or editing is erased so that no record of the music information, etc. will be recognized on the MD during a subsequent reproducing process.

However, the above-described conventional MD recorder is designed so that the above-mentioned trial record is implemented only when the table-of-contents information is recorded for the first time after the MD recorder is switched on during a period of time from the switching-on operation to the switching-off operation, that is to say, only when the MD is being ejected after the completion of the process of recording or editing implemented for the first time after the MD recorder is switched on.

Accordingly, the above-described trial recording is not implemented when, for example, the recording/editing process is implemented on other MDs without switching off the MD recorder after the trial recording is once implemented and the recording of the table-of-contents information is implemented.

Thus, there has been a drawback that, if failure occurs in the above-described magnetic head after the trial recording is once implemented and before the table-of-contents information is recorded on the other MDs, not only the new table-of-contents information, but also the previous table-of-contents information indicating the music information, etc. immediately before the implementation of the new recording or editing may be erased.

Although commercializing an MD recorder for in-car-use has progressed, the MD recorder for in-car-use has an extremely high possibility of failure in the magnetic head because such an MD recorder is used under the environment with volatile temperature and a lot of vibration. Accordingly, the above-described problems occur in more serious manner.

SUMMARY OF THE INVENTION

Here, in view of each of the above-described problems, the present invention has an object to provide an information recording apparatus and an information recording method that can record the table-of-contents information while preventing the table-of-contents information that is necessary for the reproduction of the music information, etc. from being entirely destroyed.

According to the present invention, the content information being identical with that on a content information recording area is recorded on other content information recording areas only when the recording result is confirmed to be successful. Therefore, even if the content information is recorded on a part of the content information recording areas in the state where the recording result is unsuccessful, it can be prevented that the content information is recorded on the other content information recording areas in the same state, and that the existing content information is destroyed when there is any content information already recorded on the other content information recording areas.

Accordingly, it can be prevented that all of the content information recording areas have unsuccessful recording results, and that all of the content information that is necessary upon reproduction of the main information is destroyed.

Accordingly, the content information can be recorded on all of the content information recording areas in the state where the successful recording result can be obtained.

Accordingly, the recording result can quickly be judged with a simple structure.

Accordingly, the content information that needs backup because of its importance upon reproduction can be recorded in a detectable manner quickly and accurately.

Accordingly, the content information being identical with that on a content information recording area is recorded on other content information recording areas only when the recording result is confirmed to be successful. Therefore, even if the content information is recorded on the part of the content information recording areas in the state where the recording result is unsuccessful, it can be prevented that the content information is recorded on the other content information recording areas in the same state, and that the existing content information is destroyed when there is any content information already recorded on the other content information recording areas.

Accordingly, the content information can be recorded on all of the content information recording areas in the state where the successful recording result can be obtained.

BRIEF DESCRIPTION OF THE DRAWINGS

FIG. 6 is a table showing a recording state of each cluster in the case where the table-of-contents information is recorded in a good condition; and FIGS. 7(*a*) to 7(*c*) are tables showing the recording state of each cluster in the case where the table-of-contents information is not recorded in a good condition, and FIG. 7(*a*) is a table showing the recording state of unsuccessful recording on the first cluster, FIG. 7(*b*) is a table showing the recording state of unsuccessful recording on the second cluster, and FIG. 7(*c*) is a table showing the recording state of unsuccessful recording on the third cluster.

DESCRIPTION OF THE PREFERRED EMBODIMENTS

Now, a preferred embodiment of the present invention will be explained with reference to the accompanied drawings.

In the embodiment that will be described below, the present invention is applied to a case of writing the above-described table-of-contents information (UTOC information) in an MD with a recording format that is similar to a conventional format.

(I) Embodiment of an MD Format

A general explanation will be given of an MD format used for an MD, that is to say, the recording format adopted to record audio information such as music information on the MD with reference to FIG. 1 to FIG. 3 prior to the description of the embodiment of the present information.

Figure 1:
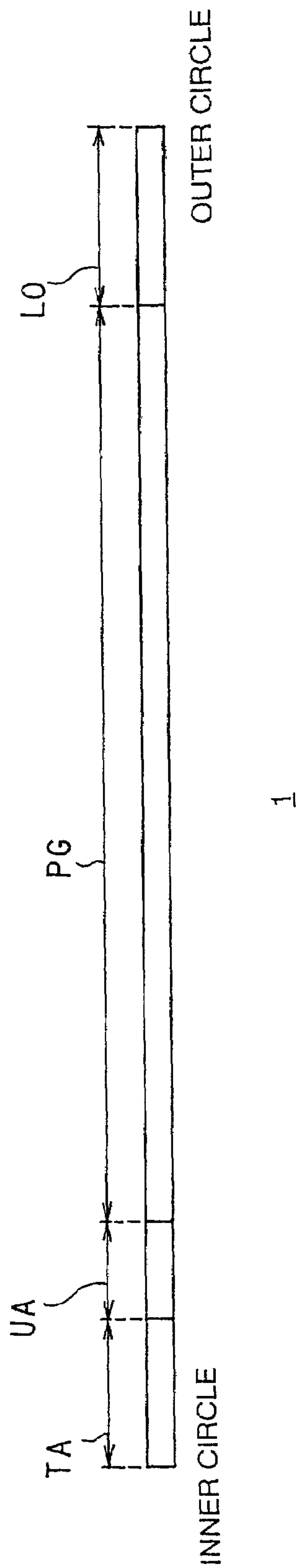
FIG. 1 is a view showing a total structure of an MD.
Figure 2:
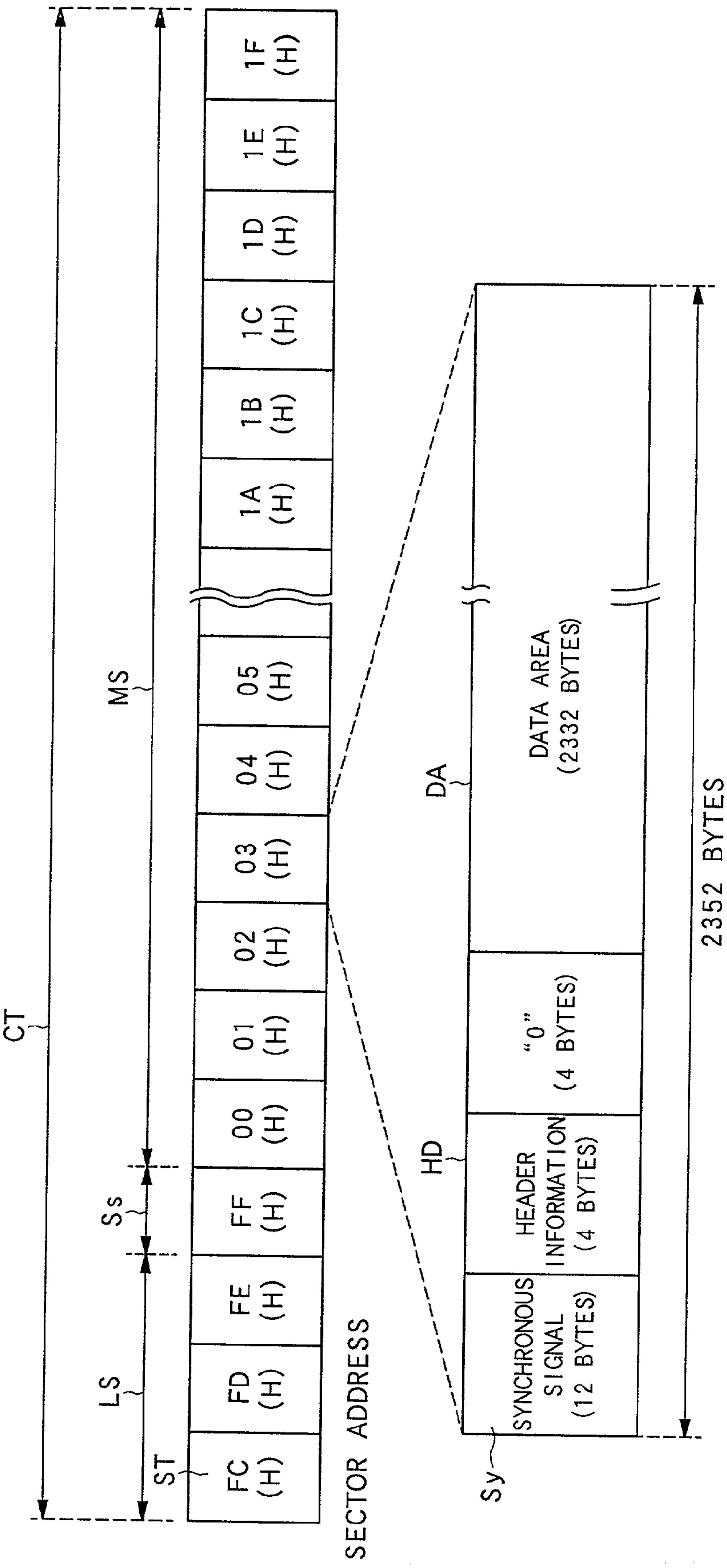
FIG. 2 is a view showing a structure of a cluster.
Figure 3:
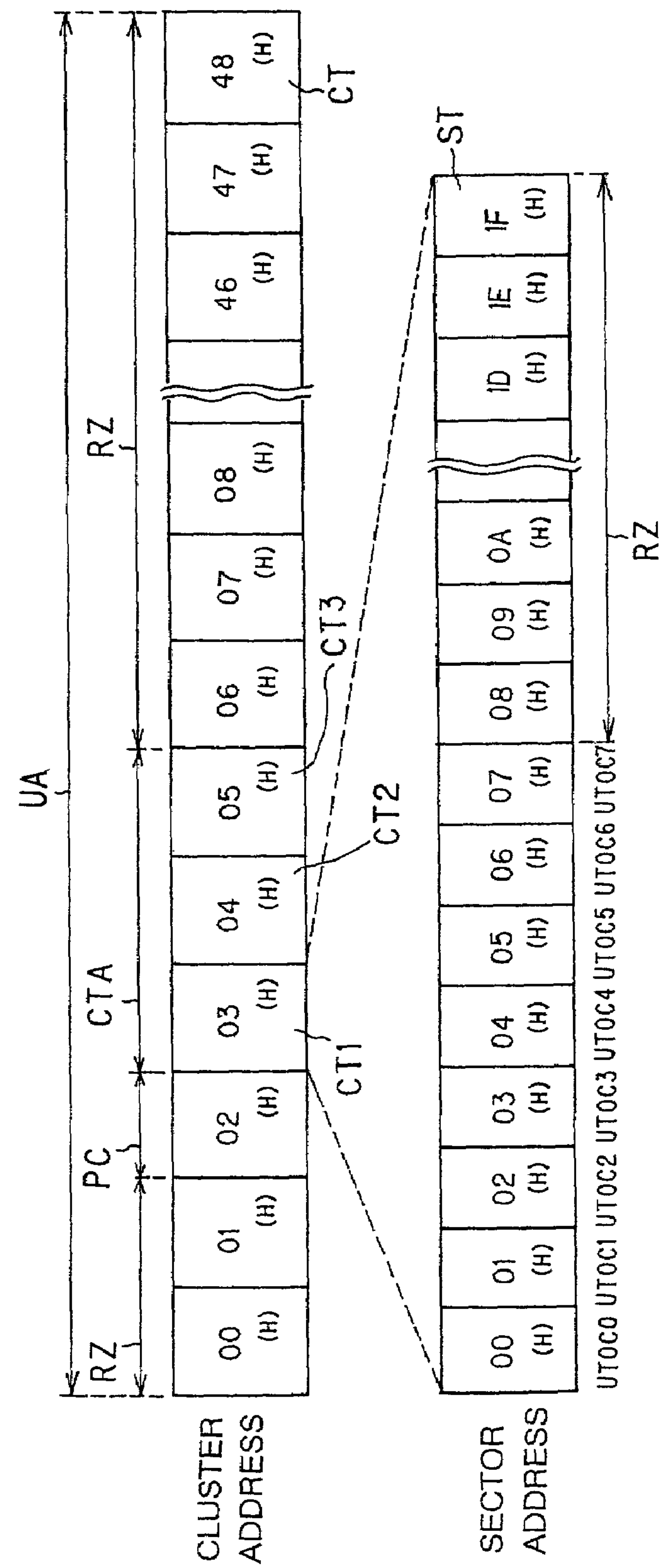
FIG. 3 is a view showing a structure of a UTOC area.

FIG. 1 shows a total structure of the MD, FIG. 2 shows a structure of a cluster, which is a unit of area partition on the MD, and FIG. 3 shows a structure of an UTOC area, which is an area on the MD on which the above-described table-of-contents information is recorded.

Now, an explanation will be given of the total structure of a recordable MD with reference to FIG. 1.

As is shown in FIG. 1, the MD 1 is composed of, in order from its inner circle to its outer circle, a TOC (Table of Contents) area TA having information, which can be reproduced only, a UTOC area UA on which the above-described table-of-contents information is recorded, a program area PG on which the audio information to be reproduced is recorded, and a lead-out area LO on which ending information for ending the reproduction of the information recorded on the MD 1, is previously recorded and any new information will never be recorded.

Among those areas, necessary information for implementing recording such as starting addresses of the UTOC area UA, the program area PG, and the lead-out area LO on the MD 1 as well as a recommended recording laser power value and the like is previously recorded on the TOC area TA at the innermost circular portion by information pits.

Then, as will be described below, the table-of-contents information including information such as the starting address and the ending address of the audio information recorded on the program area PG of the MD 1, names of songs, a number of the songs indicating the audio information, and reproduction time information is recorded. Whenever editing is implemented, for example, the audio information is recorded or erased, the table-of-contents information indicating the recorded or edited audio information is substitutively written on the UTOC area UA.

Moreover, the audio information, has been subjected to, for example, compressing process is recorded on the program area PG.

At this time, on the above-described UTOC area UA, program area PG, and lead-out area LO, tortuous guide grooves are previously formed, and an absolute address that is essential for recording on the MD 1 is recorded.

Now, an explanation will be given of the structure of the cluster including a sector, which is the minimum recording unit for the recording of the audio information on the MD 1, with reference to FIG. 2.

As is shown in FIG. 2, the minimum unit for the recording on the MD 1 is a sector ST, and one cluster CT is composed of 36 sectors ST.

At this time, cluster addresses are given to the respective clusters CT so as to increase from the inner circle to the outer circle of the MD 1.

Moreover, one cluster CT is composed of a main information sector MS having 32 sectors ST, a link sector LS having 3 sectors ST, and a supplementary information sector SS having a single sector ST.

Here, the sector addresses are also given to the sectors ST respectively as shown in FIG. 2. More specifically, the addresses "00(H)" ((H) indicates the hexadecimal notation. The same applies to all below) to "1F (H)" are given to the sectors ST in the main information sector MS, and "FC(H)" to "FE(H)" are given to the sectors ST in the link sector LS, and "FF(H)" is given to the sector ST composing the supplementary information sector SS.

On the other hand, one sector ST is composed of a data area DA of 2332 bytes, a synchronous signal SY indicating the head of the sector ST, header information HD including the cluster address, the sector address, etc., and zero data of 4 bytes.

Then, the audio information, which has been subjected to compressing process is recorded on the data area DA of the sectors ST composing the main information sector MS. The supplementary information such as letter information added to the audio information is recorded on the data area DA of the sectors ST composing the supplementary information sector SS.

Here, it is standardized that recording operation on the MD 1 is implemented in a unit of the cluster CT, and connection recording, that is to say, recording start and recording suspension is implemented at a center of the sector ST having the address "FD(H)". According to this, there is a large possibility that the recorded audio information becomes discontinuous at a position around the connection recording that corresponds to the sector ST having the address "FD(H)". Therefore, the above-described link sector LS composed of three sectors ST including the sector ST having the address "FC(H)" and the sector ST having the address "FE(H)" that are both located around the sector ST having the address "FD(H)" is provided in light of so-called distance of error correction codes. At this time, the "0" data is recorded on all of the data areas DA in the respective sectors ST composing the link sector LS, and it is impossible to record a valid data.

Moreover, the table-of-contents information recorded on the UTOC area UA is composed in a unit of the sector ST in a similar manner, and the recording operation on the UTOC area UA is implemented in a unit of the cluster CT.

Now, an explanation will be given of a structure of the UTOC area UA of the present invention with reference to FIG. 3.

As is shown in FIG. 3, the UTOC area UA is composed of 48 clusters CT, and the above-described table-of-contents information is recorded only on a table-of-contents information area CTA composed of three clusters CT, i.e., the first cluster CT1 having the address "03(H)", the second cluster CT2 having the address "04(H)" and the third cluster CT3 having the address "05(H)".

On one hand, the cluster CT having the address "02(H)" is a PC (Power Calibration) area PC on which there is recorded the information used when the optimum recording power of an optical beam for recording, for example, the audio information on the program area PG is actually recorded/reproduced and is set, and the remaining 44 clusters CT are reserves RZ.

On the other hand, it is standardized that the same table-of-contents information is recorded on each of three clusters CT (the first cluster CT1 to the third cluster CT3) in the above-described table-of-contents information area CTA on which the table-of-contents information is recorded. Moreover, in the first cluster CT1 to the third cluster CT3, the sectors ST having the addresses "00(H)" to "07(H)" are defined, and the remaining 24 sectors ST are reserves RZ.

The sector ST having the address "00(H)" called UTOC sector 0 is an essential sector on which a recording starting address and a recording ending address, etc. of the audio information are recorded on as the table-of-contents information.

The reason why the identical table-of-contents information is recorded on each of the first cluster CT1 to the third cluster CT3 is to, by recording the same table-of-contents information repeatedly and sequentially, ensure the backup of the table-of-contents information regarded to be important upon reproduction of the audio information, while enabling easy and quick detection of the table-of-contents information upon its reproduction.

The information recorded on the other sectors ST is an option, and the names of the songs, etc. of the audio information can be recorded as the table-of-contents information. Moreover, the "0" data is recorded on all of the sectors ST serving as the reserves RZ and the sectors ST that are optional and are unused.

(II) Embodiment

Next, an explanation will be given of a structure and operation of an information recording/reproducing apparatus according to the embodiment for recording the table-of-contents information and the audio information on the MD having the above-described recording format with reference to FIG. 4 to FIG. 7.

Figure 4:
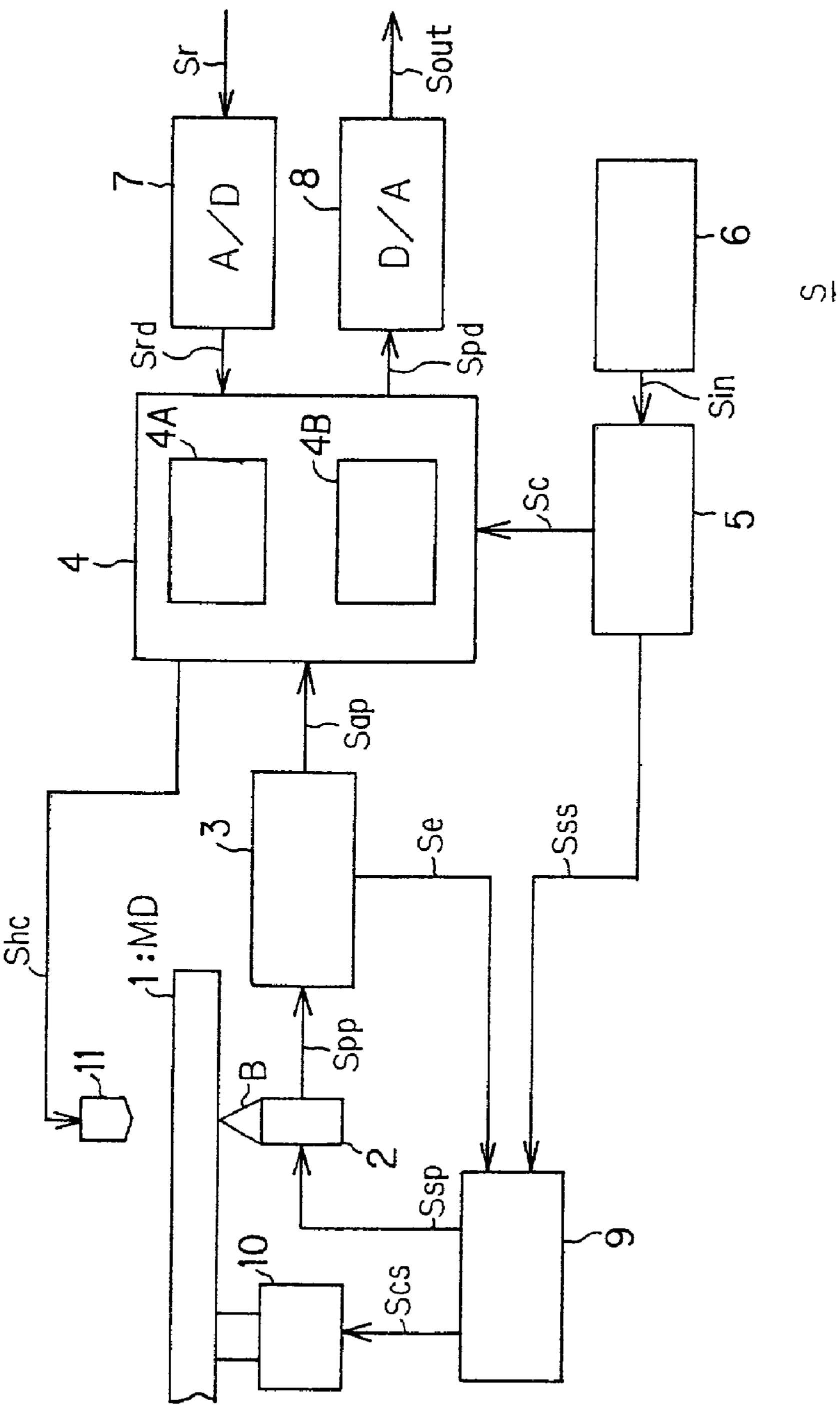
FIG. 4 is a block diagram showing a schematic structure of an information recording/reproducing apparatus according to an embodiment.
Figure 5:
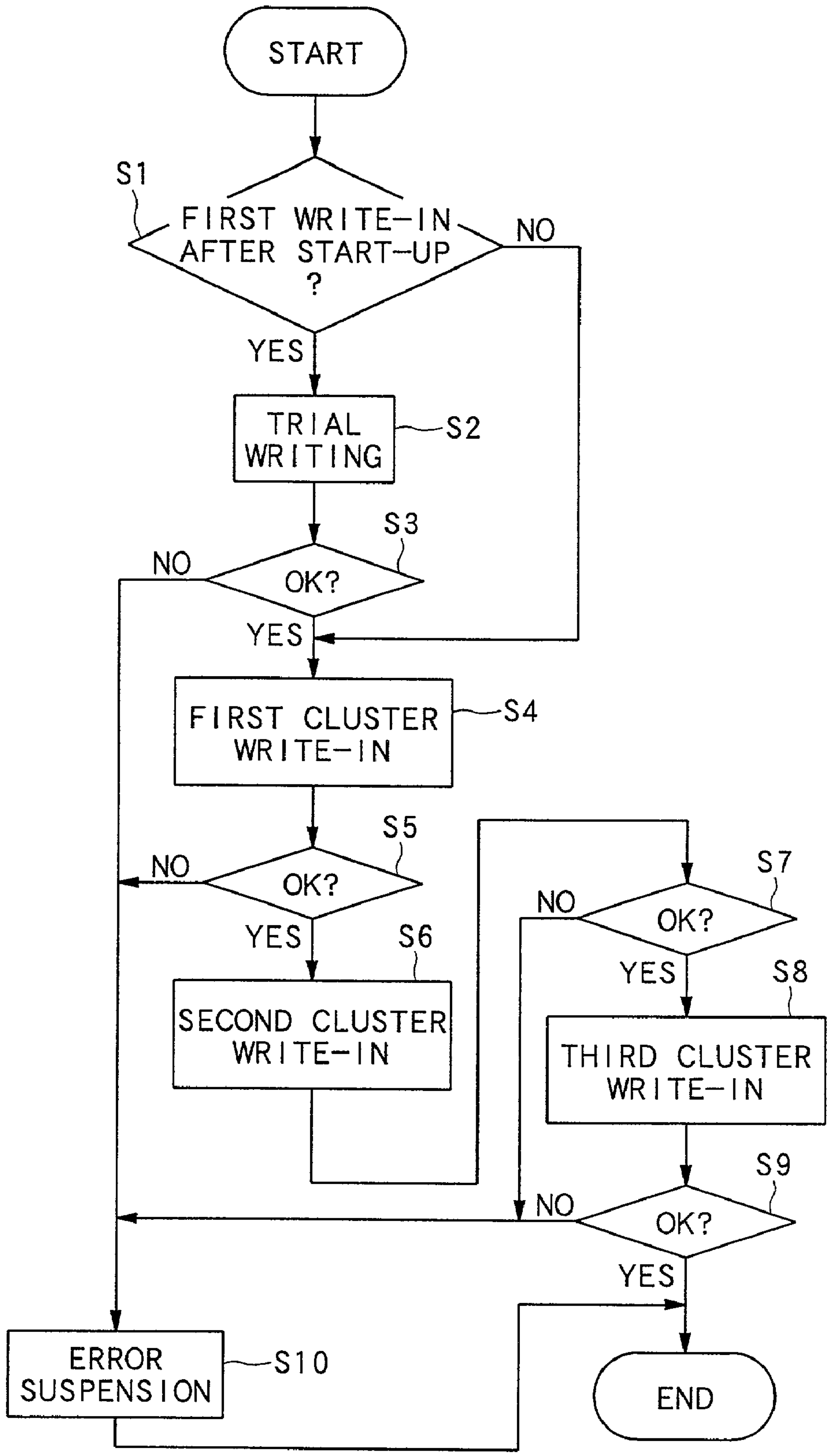
FIG. 5 is a flowchart showing a recording process of table-of-contents information according to the embodiment.

FIG. 4 is a block diagram showing a schematic structure of the information recording/reproducing apparatus according to the embodiment, FIG. 5 is a flowchart showing a table-of-contents information recording process according to the embodiment, FIG. 6 is a table explaining a recording style of the table-of-contents according to the embodiment, and FIG. 7(*a*) to FIG. 7(*c*) are tables explaining the cases where a recording error occurs during a recording process of the table-of-contents information according to the embodiment.

First, an explanation will be given of the schematic structure and the operation of the information recording/reproducing apparatus according to the embodiment with reference to FIG. 4.

As shown in FIG. 4, the information recording/reproducing apparatus S according to the embodiment is composed of a pickup 2 serving as a recording device and a detecting device, an amplifier 3, a recording/reproducing portion 4, a CPU 5 serving as a confirming device, a control device, and a judging device, an operating portion 6, an A/D (Analog/Digital) converter 7, a D/A (Digital/Analog) converter 8, a servo IC (Integrated Circuit) 9, a spindle motor 10, and a magnetic head 11.

The recording/reproducing portion 4 includes a write-in image buffer 4A and a comparison-purpose buffer 4B both serving as a temporarily storing device composed of RAM (Random Access Memory), etc.

Now, an explanation will be given of the summarized operation.

First, an explanation will be given of the operation in the case where the audio information recorded on the MD 1 is reproduced.

Upon reproduction of the information, the spindle motor 10 rotates the MD 1 at a previously set rotation rate on the basis of a spindle drive signal Scs from the servo IC 9.

The pickup 2 focuses the optical beam B having a prescribed intensity for information reproduction while irradiating the beam on a reproduced position on the rotating MD 1, receives the reflected light of the irradiated optical beam B from the MD 1, generates a detection signal Spp corresponding to the audio information recorded on the MD 1, and outputs the signal to the amplifier 3.

At this time, a gap between a focusing position of the optical beam B and a position of an information track on an information recording surface of the MD 1 in vertical and horizontal directions against the information recording surface is eliminated by moving an objective lens for focusing the optical beam B, which is not shown in figures, to the vertical or horizontal direction on the basis of the pickup servo signal Ssp from the servo IC 9. That is to say, in the information recording/reproducing apparatus S, a focus servo control and a tracking servo control are implemented.

Then, the amplifier 3 implements an amplification process to the detection signal Spp at a pre-set amplification rate in order to generate the amplified detection signal Sap, and outputs the signal to the recording/reproducing portion 4.

At the same time, the amplifier 3 generates, from the detection signal Spp, an error signal Se indicating the above-described gap between the position of the above-described information track and the focusing position of the optical beam B in the vertical and horizontal directions, and outputs the signal to the servo IC 9. The error signal Se includes a focus error signal indicating the gap in the vertical direction and a tracking error signal indicating the gap in the horizontal direction.

On the basis of the control signal Sss from the CPU 5, the servo IC 9 generates the above-described pickup servo signal Ssp so that levels of the error signals Se become zero, and outputs the signal to the pickup 2, while generating the above-descried spindle drive signal Scs, and outputting the signal to the spindle motor 10. In this manner, the above-described focus servo control and tracking servo control are implemented as well as so-called spindle servo control while the MD 1 is rotated.

The recording/reproducing portion 4 implements a pre-set decoding process to the above-described amplified detection signal Sap outputted from the amplifier 3 on the basis of the control signal Sc from the CPU 5 to generate a decoding signal Spd corresponding to the audio information recorded on the MD 1, and outputs the signal to the D/A converter 8.

The D/A converter 8 converts the decoding signal Spd into analog mode, and outputs the signal to an external speaker, etc., which is not shown in figures, as a reproduction signal Sout corresponding to the above-described audio information.

By the above-descried operations, the reproducing process of the audio information recorded on the MD 1 is implemented.

Now, an explanation will be given of the operation in the case where the audio information is recorded on the MD 1.

When the audio information Sr to be recorded on the MD 1 is inputted from outside, the A/D converter 7 converts the audio information Sr into digital mode to generate a digital audio signal Srd, and outputs the signal to the recording/reproducing portion 4.

The recording/reproducing portion 4 implements a pre-set compression coding process to the digital audio signal Srd on the basis of the control signal Sc from the CPU 5 to generate the coding signal Shc, and outputs the signal to the magnetic head 11.

At the same time, the pickup 2 irradiates the optical beam B having a prescribed intensity that is stronger than the above-described intensity for information reproduction on a recording position on which the audio information Sr should be recorded on the above-described information track on the MD 1.

At this time, the MD 1 is rotated at the pre-set rotation rate by the spindle motor 10 being driven on the basis of the spindle drive signal Scs in a similar manner to the information reproduction.

The gap between the focusing position of the above-described optical beam B for the information recording and the above-described recording position on the MD 1 in the vertical and horizontal directions against the information recording surface is eliminated by implementing the focus servo control and the tracking servo control in a similar manner to the information reproduction.

The magnetic head 11 changes a direction of magnetization of the recording position on the information track whose temperature increased by being irradiated the high-intensity optical beam B for the information recording on the basis of a coding signal Shc. By the change of the magnetization direction, the coding signal Shc is recorded on the above-described information track as the change of the magnetization direction. According to this, the audio information Sr is recorded on the MD 1.

On the basis of an operating signal Sin outputted from the operating portion 6 in correspondence with the operation implemented by a user at the operating portion 6, the CPU 5 generates the above-described control signals Sc and Sss, and outputs the signals to the recording/reproducing portion 4 and the servo IC 9 respectively so that each of the above-described structure members can be controlled and the above-described recording process and reproducing process are implemented.

When a series of recording processes of the audio information Sr is finished, and the operation of ejecting the MD 1 from the information recording/reproducing apparatus S is implemented at the operating portion 6, the CPU 5, by using the change of the magnetization direction in a similar manner to the case of the above-described recording process of the audio information Sr, generates the control signal Sc for controlling the recording/reproducing portion 4 so that the table-of-contents information can be recorded on the first cluster CT 1 to the third cluster CT 3 on the table-of-contents information area CTA composing the above-described UTOC area UA, and outputs the signal to the recording/reproducing portion 4.

According to this, the recording/reproducing portion 4 implements the recording process of the table-of-contents information in the present invention, which will be indicated below, by using the above-described write-in image buffer 4A and the comparison-purpose buffer 4B, and records the identical table-of-contents information on the first cluster CT1 to the third cluster CT3 respectively.

Now, an explanation will be given of the recording process of the table-of-contents information in the present invention with reference to FIG. 5 to FIG. 7.

As is shown in FIG. 5, during the table-of-contents information recording process in this embodiment, judgment is made on at first whether or not the recording process of the table-of-contents information attempted to be implemented at the present is the first one after the information recording/reproducing apparatus S is switched on result of the trial recording is judged to be unsuccessful because of the occurrence of some kind of failure, etc. in the magnetic head 11.

Then, when an unsuccessful result is obtained from the trial recording according to the judgment at the step S3 (step S3; NO), the recording of the table-of-contents information is stopped while the error of the recording of the table-of-contents information is indicated (step S10), and the process is ended. This is because, if the recording of the table-of-contents information is continued as it is, the new table-of-contents information to be recorded will not be successfully recorded, and not only that, the previous table-of-contents information indicating the recorded contents of the MD 1 immediately before the present recording or editing will be destroyed.

On the other hand, when a successful result is obtained from the trial recording according to the judgment at the step S3 (step S3; YES), the table-of-contents information is recorded only on the first cluster CT 1 in the table-of-contents information area CTA (step S4).

Then, whether or not the recording of the table-of-contents information on the first cluster CT1 could obtain the successful recording result is judged (step S5). At this time, during the process at the step S5, the stored contents of the image buffer 4A in which the table-of-contents information being identical with the one recorded on the first cluster CT1 is compared with the stored contents of the comparison-purpose buffer 4B in which the table-of-contents detected immediately after being recorded is stored in a similar manner to a judgment process at the above-described step S3. If they coincide with each other, the obtained recording result is judged to be successful. On the other hand, if they do not coincide with each other, the obtained (Step S1).

The process of the Step S1 is implemented by confirming the contents of a flag that is provided in a memory, which is not shown in figures, in the recording/reproducing portion 4, and indicates the number of the recording of the table-of-contents information after the power is supplied (in other words, the number of ejection operation of the MD 1).

Then, when the recording process of the first table-of-contents information is not the first one after the power is supplied (step S1; NO), a step S4 is then implemented. On the other hand, when the recording process of the table-of-contents information is the first one after the power is supplied (step S1; YES), trial recording of the table-of-contents information is implemented by using an empty area among the areas besides the above-described first cluster CT1 to the third cluster CT3 on the UTOC area UA (step S2).

After this, whether or not the result of the trial recording is in a good condition is judged (step S3). At this time, during the process at the step S3, the table-of-contents information being identical with the table-of-contents information subjected to the trial recording is temporarily recorded on the write-in image buffer 4A. Moreover, the table-of-contents information subjected to the trial recording is detected from the recording position on the MD 1 immediately after that, and is stored in the comparison-purpose buffer 4B. Then, stored contents of the write-in image buffer 4A is compared with stored contents of the comparison-purpose buffer 4B. If they coincide with each other, the obtained recording result is judged to be successful. On the other hand, if they do not coincide with each other, the obtained recording recording result of the trial recording is judged to be unsuccessful.

When an unsuccessful result is obtained from the recording on the first cluster CT1 according to the judgment at the step S5 (step S5; NO), the recording of the table-of-contents information is stopped, and the process is ended at the above-described step S10. This is because, if the recording of the table-of-contents information on the other clusters is continued as it is, the new table-of-contents information will not be successfully recorded, and not only that, the previous table-of-contents information indicating the previous recorded contents of the MD 1 will be destroyed concerning all of the first cluster CT1 to the third cluster CT3.

On the other hand, when a successful result is obtained from the recording on the first cluster CT 1 according to the judgment at the step S5 (step S5; YES), a step S6 is then implemented.

Here, an explanation will be given of the recording state of each cluster immediately after the any one of the judgment at the step S5 is finished with reference to FIG. 6 and FIG. 7.

First, as is shown in FIG. 6, it is assumed that the table-of-contents information indicating the previously recorded contents on the MD 1 (the table-of-contents information will be called table-of-contents information A below) is recorded on all of the first cluster CT1 to the third cluster CT3 before the process at the step S4. When a successful result is obtained from the recording according to the judgment at the step S5 (step S5; YES), as is shown in FIG. 6, new table-of-contents information corresponding to the present recording or editing process (the table-of-contents information will be called table-of-contents information B below) is rewritten on only the first cluster CT1 while the state where the table-of-contents information A is recorded on the second cluster CT2 and the third cluster CT3 is sustained.

Accordingly, at the next reproduction process, by referring to the table-of-contents information B recorded on the first cluster CT1, the reproducing process can be implemented with the contents of the recording or editing process implemented immediately before the process shown in FIG. 5.

On the other hand, when the table-of-contents information A is recorded on all of the first cluster CT1 to the third cluster CT3 before the process at the step S4, and an unsuccessful result is obtained from the recording according to the judgment at the step S5 (step S5; NO), as is shown in FIG. 7(*a*), an error state is rewritten on only the first cluster CT1 (that is to say, a state where the table-of-contents B cannot be detected) while the state where the table-of-contents information A is recorded on the second cluster CT2 and the third cluster CT3 is sustained.

Accordingly, at the next reproduction process, although the contents of the recording or editing process implemented immediately before the process shown in FIG. 5, the reproducing process can be implemented with the contents of the previous recording or editing process by referring to the table-of-contents information A recorded on the second cluster CT2 or the third cluster CT3.

Returning to FIG. 5 again, when a result in a good condition could be obtained from the recording of the table-of-contents information B on the first cluster CT1 (step S5; YES), the table-of-contents information B is recorded only on the second cluster CT2 on the table-of-contents information area CTA (step S6).

Then, whether or not the recording of the table-of-contents information B on the second cluster CT2 could obtain the successful recording result is judged (step S7). At this time, during the process at the step S7, the propriety of the recording result is judged in a similar manner to the judgment process at the above-described step S3 or S5.

When an unsuccessful result is obtained from the recording on the second cluster CT2 according to the judgment at the step S7 (step S7; NO), the recording of the table-of-contents information B is stopped while the process is ended at the above-described step S10. This is because, if the recording of the table-of-contents information on the third cluster CT3 is continued as it is, the new table-of-contents information B will not be successfully recorded both on the second cluster CT2 and the third cluster CT3, and not only that, the previous table-of-contents information A will be destroyed.

On the other hand, when a successful result is obtained from the recording on the second cluster CT2 according to the judgment at the step S7 (step S7; YES), a step S8 is then implemented.

Here, an explanation will be given of the recording state of each cluster immediately after the any one of the judgment at the step S7 is finished with reference to FIG. 6 and FIG. 7.

First, as is shown in FIG. 6, the table-of-contents information B is recorded on the first cluster CT1, and the table-of-contents information A is recorded on the second cluster CT2 and the third cluster CT3 before the process at the step S6. However, when a successful result is obtained from the recording according to the judgment at the step S7 (step S7; YES), as is shown in FIG. 6, the table-of-contents information B is rewritten on the first cluster CT1 and the second cluster CT2 while the state where the table-of-contents information A is recorded on the third cluster CT3 is sustained.

Accordingly, at the next reproduction process, by referring to the table-of-contents information B recorded on the first cluster CT1 or the second cluster CT2, the reproducing process can be implemented with the contents of the recording or editing process implemented immediately before the process shown in FIG. 5.

On the other hand, when the table-of-contents information B is recorded on the first cluster CT1 and the table-of-contents information A is recorded on the second cluster CT2 and the third cluster CT3, and an unsuccessful result is obtained from the recording according to the judgment at the step S7 (step S7; NO), as is shown in FIG. 7(*b*), an error state is rewritten on the second cluster CT2 and the table-of-contents information B is rewritten on the first cluster CT1, while the state where the table-of-contents information A is recorded on the third cluster CT3 is sustained.

Accordingly, at the next reproduction process, by referring to the table-of-contents information B recorded on the first cluster CT1, the reproducing process can be implemented with the contents of the recording or editing process implemented immediately before the process shown in FIG. 5.

Returning to FIG. 5 again, when a result in a good condition could be obtained from the recording of the table-of-contents information B on the second cluster CT2 (step S7; YES), the table-of-contents information B is then recorded only on the third cluster CT3 on the table-of-contents information area CTA (step S8).

Then, whether or not the recording of the table-of-contents information B on the third cluster CT3 could obtain the successful recording result is judged (step S9). At this time, during the process at the step S9, the propriety of the recording result is judged in a similar manner to the judgment process in the above-described step S3, S5, or S7.

When an unsuccessful result is obtained from the recording on the third cluster CT3 according to the judgment at the step S9 (step S9; NO), the recording of the table-of-contents information B is stopped and the process is ended at the above-described step S10 because it is judged that the magnetic head 11 is not in the state to continue the recording of the table-of-contents information B.

On the other hand, when a successful result is obtained from the recording on the third cluster CT3 according to the judgment at the step S9 (step S9; YES), the recording of all of the table-of-contents information is regarded to be completed in a good condition and the process is ended as it is.

Besides, the MD 1 is ejected from the information recording/reproducing apparatus S as usual after the process is ended.

Here, an explanation will be given of the recording state of each cluster immediately after the ending of any one of the judgments at the step S9 with reference to FIG. 6 and FIG. 7.

First, as is shown in FIG. 6, the table-of-contents information B is recorded on the first cluster CT1 and the second cluster CT2 and the table-of-contents information A is recorded on the third cluster CT3 before the process at the step S8. When a successful result is obtained from the recording according to the judgment at the step S9 (step S9; YES), as is shown in FIG. 6, the table-of-contents information B is rewritten on all of the first cluster CT1 to the third cluster CT3.

Accordingly, at the next reproduction process, by referring to any one of the table-of-contents information B recorded on all of the first cluster CT1 to the third cluster CT3, the reproducing process can be implemented with the contents of the recording or editing process implemented immediately before the process shown in FIG. 5.

On the other hand, when the table-of-contents information B is recorded on the first cluster CT1 and the second cluster CT2, and the table-of-contents information A is recorded on the third cluster CT3, and an unsuccessful result is obtained from the recording according to the judgment at the step S9 (step S9; NO), as is shown in FIG. 7(*c*), an error state is rewritten on the third cluster CT3 while the table-of-contents information B is recorded on the first cluster CT1 and the second cluster CT2.

Accordingly, at the next reproduction process, by referring to the table-of-contents information B recorded on the first cluster CT1 or the second cluster CT2, the reproducing process can be implemented with the contents of the recording or editing process implemented immediately before the process shown in FIG. 5.

As is explained above, according to the table-of-contents information recording process according to the embodiment, the identical table-of-contents is recorded on one cluster CT and the cluster CT next to it on the table-of-contents information area CTA only when the recording result is confirmed to be successful. As a result, even if the table-of-contents information is recorded on a part of the cluster CT in the state where the recording result is unsuccessful, it can be prevented that the table-of-contents information is recorded on the next cluster CT in the same state, and that the existing table-of-contents information is destroyed when there is any table-of-contents information already recorded on the next cluster CT.

Moreover, the recording the identical table-of-contents information on all of the first cluster CT1 to the third cluster CT3 is repeatedly implemented until the recording is completed only when the recording result is confirmed to be successful. Accordingly, the table-of-contents information can be recorded on all of the first cluster CT1 to the third cluster CT3 in the state where the successful recording result can be obtained.

Furthermore, the recording result is judged by comparing the stored contents of the comparison-purpose buffer 4B with the stored contents of the write-in image buffer 4A. Accordingly, the recording result can quickly be judged with a simple structure.

Moreover, the table-of-contents information is recorded only on one of the above-described cluster CT per recording while three areas on which the table-of-contents information is recorded exist on the MD1. Accordingly, the table-of-contents information that needs backup because of its importance at the reproduction can be recorded in a detectable manner quickly and accurately.

Moreover, the table-of-contents information that is essential for the reproduction of the audio information Sr recorded on the MD 1 can successfully be recorded in the detectable manner.

Moreover, the table-of-contents information includes at least the information of the number of songs and the information of reproduction times. Accordingly, the necessary information of the number of songs, etc. for the reproduction of the audio information Sr can surely be recorded in the detectable manner.

The above-described embodiment explained the cases where the clusters CT on which the identical table-of-contents information is recorded are provided at three places. However, the present invention can be applied to the cases where the clusters CT are provided at four or more places.

In this case, when the identical table-of-contents information is recorded on the clusters CT at four or more places, only one of the clusters CT is recorded per recording of the table-of-contents information, and the recording is repeated at the number of the cluster CT.

The above-described embodiment explains the cases where the table-of-contents information is recorded on only one cluster CT per recording of the table-of-contents information. However, there can be taken the design where the table-of-contents information is recorded on two or more of the clusters CT at once as long as the number of the clusters CT is less than the number of the clusters CT on which the table-of-contents information should be recorded.

Moreover, the present information can be applied to the cases where the content information besides the table-of-contents information in the above-described embodiment that indicates the contents of the audio information, etc. (including sound information) recorded on the MD 1, is detected upon reproduction of the audio information, and is used for the reproduction is recorded on a plurality of the areas on the MD 1 with the identical contents.

Moreover, the present invention can also be applied to the cases where, on the plurality of the areas on other information recording media besides the MD 1, the content information indicating the contents of the recorded information recorded on the information recording media, being detected upon reproduction of the recording information, and being used for the reproduction is recorded with the identical contents.

The entire disclosure of Japanese Patent Application No. 2000-113917 filed on Apr. 14, 2000 including the specification, claims, drawings and summary is incorporated herein by reference in its entirety.

What is claimed is:

1. An information recording apparatus for recording content information on an information recording medium comprising a main information recording area on which main information to be reproduced is recorded, and a plurality of content information recording areas on which content information to be reproduced to indicate contents of said main information is recorded, said apparatus comprising:

a recording device for recording said content information on a first part of said plurality of content information recording areas;

a confirming device for confirming a recording result of said content information thus recorded on said first part; and a control device for controlling said recording device, only when said recording result is confirmed to be successful, so that content information that is identical with said content information recorded on said first part of said content information recording areas can be recorded on a second part of said content information recording areas, and when said recording results is confirmed to be unsuccessful, so that content information already recorded on the second part of said content information recording areas is maintained, without recording, on the second part of said content information recording areas, said content information that is identical with said content information recorded on said first part of said content information recording areas.

2. The information recording apparatus according to claim 1, wherein only when said recording result is confirmed to be successful, said control device repeatedly controls said recording device so that said content information that is identical with said content information recorded on said first part of said content information recording areas can be recorded on other parts of said content information recording areas until recording said content information on all parts of said content information recording areas is completed.

3. The information recording apparatus according to claim 1, wherein said confirming device comprises:

a temporarily storing device for temporarily storing information that is identical with said content information recorded;

a detecting device for detecting said content information recorded from said content information recording areas; and a judging device for judging the recording result by comparing said content information thus detected with the information stored in said temporarily storing device.

4. The information recording apparatus according to claim 1, wherein said content information recording areas exist at three parts in said information recording medium; and said recording device records said content information on only one of said content information recording parts per recording and confirmation.

5. An information recording method for recording content information on an information recording medium comprising a main information recording area on which main information to be reproduced is recorded, and a plurality of content information recording areas on which content information to be reproduced to indicate contents of said main information is recorded, said method comprising:

a recording process of recording said content information on a first part of said plurality of content information recording areas;

a confirming process of confirming a recording result of said content information thus recorded on the first part; and a control recording process of controlling subsequent recording to other parts of the content information recording areas only when said recording result is confirmed to be successful, so that content information that is identical with said content information recorded on said first part of said content information recording areas can be recorded on other parts of said content information recording areas, and when said recording results is confirmed to be unsuccessful, so that content information already recorded on the second part of said content information recording areas is maintained, without recording, on the second part of said content information recording areas, said content information that is identical with said content information recorded on said first part of said content information recording areas.

6. The information recording method according to claim 5, wherein only when a last one of said recording result is confirmed to be successful, recording is repeatedly controlled during said process of controlling recording so that said content information that is identical with said content information recorded on the first part of said content information recording areas can be recorded on the other parts of said content information recording areas until recording said content information on all of said content information recording areas is completed.

7. An information recording apparatus for recording content information on an information recording medium with a program area for storing recorded main information to be reproduced, and a UTOC area with plural content information recording clusters for recording and storing location information of recorded main information, the apparatus comprising:

a recording device for recording the location information on a present cluster of the plural content information recording clusters;

a confirming device for confirming, subsequent to recording on the present cluster and prior to recording on a next cluster of the plural content information recording clusters, a recording result of the location information thus recorded on the present cluster; and a control device for controlling the recording device to only allow a subsequent recording of the location information on the next cluster to when the recording result is confirmed to be successful by the location information being identical with location information recorded on a most recently recorded one of the plural content information recording clusters, and to maintain, when said recording results is confirmed to be unsuccessful, the location information already recorded on the present cluster, without allowing the subsequent recording of the location information on the next cluster.

8. The information recording apparatus of claim 7, wherein said confirming device comprises:

a temporarily storing device for temporarily storing information identical with the location information;

a detecting device for detecting the location information recorded from the clusters; and a judging device for judging the recording result by comparing the detected location information with the temporarily stored information.

9. The information recording apparatus of claim 8, wherein there are three adjacent content information recording clusters.

10. The information recording apparatus of claim 9, wherein when the recording result is judged unsuccessful in that the recorded result is not identical to the temporarily stored information, the control device stops further action of the recording device from recording to further ones of the content information recording clusters and executes an error suspension.

11. The information recording apparatus of claim 10, wherein when the recording result after recording to a second of the clusters is judged unsuccessful, the three clusters are left with i) the location information stored in a first of the cluster, ii) an error indication stored in the second cluster, and iii) in a third cluster, other location information different from the location information stored in the first cluster.

12. The information recording apparatus of claim 10, wherein when the recording result after recording to a third of the clusters is judged unsuccessful, the three clusters are left with i) the location information stored in a first and a second of the clusters and ii) an error indication stored in the third cluster.

13. The information recording apparatus of claim 8, wherein when the recording result is judged unsuccessful in that the recorded result is not identical to the temporarily stored information, the control device stops further action of the recording device from recording to further ones of the content information recording clusters and executes an error suspension.

14. The information recording apparatus of claim 7, wherein there are three adjacent content information recording clusters.

* * * * *